United States Patent
Ho et al.

(10) Patent No.: US 9,218,060 B2
(45) Date of Patent: Dec. 22, 2015

(54) VIRTUAL MOUSE DRIVING APPARATUS AND VIRTUAL MOUSE SIMULATION METHOD

(75) Inventors: Cheng-Yuan Ho, Taipei (TW); I-Heng Meng, Taipei (TW); Chen-Chiung Hsieh, Pingzhen (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 1055 days.

(21) Appl. No.: 13/309,491

(22) Filed: Dec. 1, 2011

(65) Prior Publication Data

US 2013/0111414 A1   May 2, 2013

(30) Foreign Application Priority Data

Oct. 31, 2011   (TW) .............................. 100139548 A (51) Int. Cl.
*G06K 9/00* (2006.01)
*G06F 3/01* (2006.01)
*G06F 3/033* (2013.01)

(52) U.S. Cl.
CPC ............ *G06F 3/017* (2013.01); *G06K 9/00355* (2013.01)

(58) Field of Classification Search
USPC ......... 382/100, 103, 106–108, 124, 126, 140, 382/162, 168, 173, 181, 193–194, 199, 209, 382/219, 232, 254, 266, 274, 291–294, 305, 382/312, 321; 345/169, 158, 156, 163; 70/408
See application file for complete search history.

(56) References Cited

U.S. PATENT DOCUMENTS

| | | | | |
|---|---|---|---|---|
| 7,849,421 | B2 | 12/2010 | Yoo et al. | |
| 7,849,721 | B2 * | 12/2010 | Bass | A45C 11/321 307/10.3 |
| 8,339,359 | B2 * | 12/2012 | Hsieh | G06F 3/017 345/156 |
| 2008/0259031 | A1 * | 10/2008 | Yoshino | G06F 3/011 345/158 |
| 2010/0231522 | A1 * | 9/2010 | Li | G06F 3/0423 345/169 |
| 2010/0329509 | A1 * | 12/2010 | Fahn | G06K 9/00355 382/103 |
| 2011/0006991 | A1 | 1/2011 | Elias | |

FOREIGN PATENT DOCUMENTS

| | | |
|---|---|---|
| CN | 102200834 | 9/2011 |
| TW | 201120681 | 6/2011 |

OTHER PUBLICATIONS

Taiwanese language office action dated Jan. 20, 2014.
English language translation of abstract of TW 201120681 (pp. 3-4 of publication, published Jun. 16, 2011).
Chinese language office action dated Mar. 10, 2015, issued in application No. 201110389332.X.

* cited by examiner

*Primary Examiner* — Seyed Azarian
(74) *Attorney, Agent, or Firm* — McClure, Qualey & Rodack, LLP (57) ABSTRACT

A virtual mouse simulation method used in a virtual mouse driving apparatus is provided. The method has the following steps of: capturing a plurality of input images continuously; detecting a finger area from the plurality of input images; detecting a specific event of the finger area; and generating a corresponding virtual mouse control command according to the specific event.

8 Claims, 7 Drawing Sheets

VIRTUAL MOUSE DRIVING APPARATUS AND VIRTUAL MOUSE SIMULATION METHOD

CROSS REFERENCE TO RELATED APPLICATIONS

This application claims priority of Taiwan Patent Application No. 100139548, filed on Oct. 31, 2011, the entirety of which is incorporated by reference herein.

BACKGROUND OF THE INVENTION

1. Field of the Invention

The present invention relates to virtual mouse systems, and in particular relates to a virtual mouse driving apparatus and virtual mouse simulation method to simulate a mouse by recognizing single hand gestures or movements of a selected object.

2. Description of the Related Art

Recently, many electronic devices, such as PCs or set-up boxes, comprise a keyboard and a mouse to be used as a user input interface. A user may input different instructions to control the applications on the PC by simply pressing the mouse buttons or moving the mouse. However, it is very inconvenient for a user to carry a keyboard or a mouse when going out. Therefore, there is a demand for a virtual mouse driving apparatus for the user to control the applications without carrying a mouse.

BRIEF SUMMARY OF THE INVENTION

A detailed description is given in the following embodiments with reference to the accompanying drawings.

In an exemplary embodiment, a virtual mouse driving apparatus is provided. The apparatus comprises: an image capturing apparatus arranged for capturing a plurality of input images continuously; an image processing unit arranged for recognizing a finger area from the plurality of input images; an event recognition unit arranged for detecting a specific event of the finger area; and a command processing unit arranged for generating a corresponding virtual mouse control command according to the specific event.

In another exemplary embodiment, a virtual mouse simulation method used in a virtual mouse driving apparatus is provided. The method comprises the following steps of: capturing a plurality of input images continuously; detecting a finger area from the plurality of input images; detecting a specific event of the finger area; and generating a corresponding virtual mouse control command according to the specific event.

In yet another exemplary embodiment, a virtual mouse driving apparatus is provided. The apparatus comprises: an image capturing apparatus arranged for capturing a plurality of input images continuously; an image processing unit arranged for generating a corresponding background image from the plurality of input images, and obtaining a rough outline by comparing pixels in the plurality of input images and the corresponding background image, wherein the image processing unit generates a target object outline according to the rough outline, and labels a target object according to the target object outline; an event recognition unit arranged for detecting a specific event of the target object; and a command processing unit arrange for a corresponding virtual mouse control command according to the specific event.

In yet another exemplary embodiment, a virtual mouse simulation method used in a virtual mouse driving apparatus is provided. The method comprises the following steps of: capturing a plurality of input images continuously; generating a corresponding background image from the plurality of input images; obtaining a rough outline of a target object by comparing pixels in the plurality of input images and the corresponding background image; generating a target object outline according to the rough outline; labeling the target object according to the target object outline; detecting a specific event of the target object; and generating a corresponding virtual mouse control command according to the specific event.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
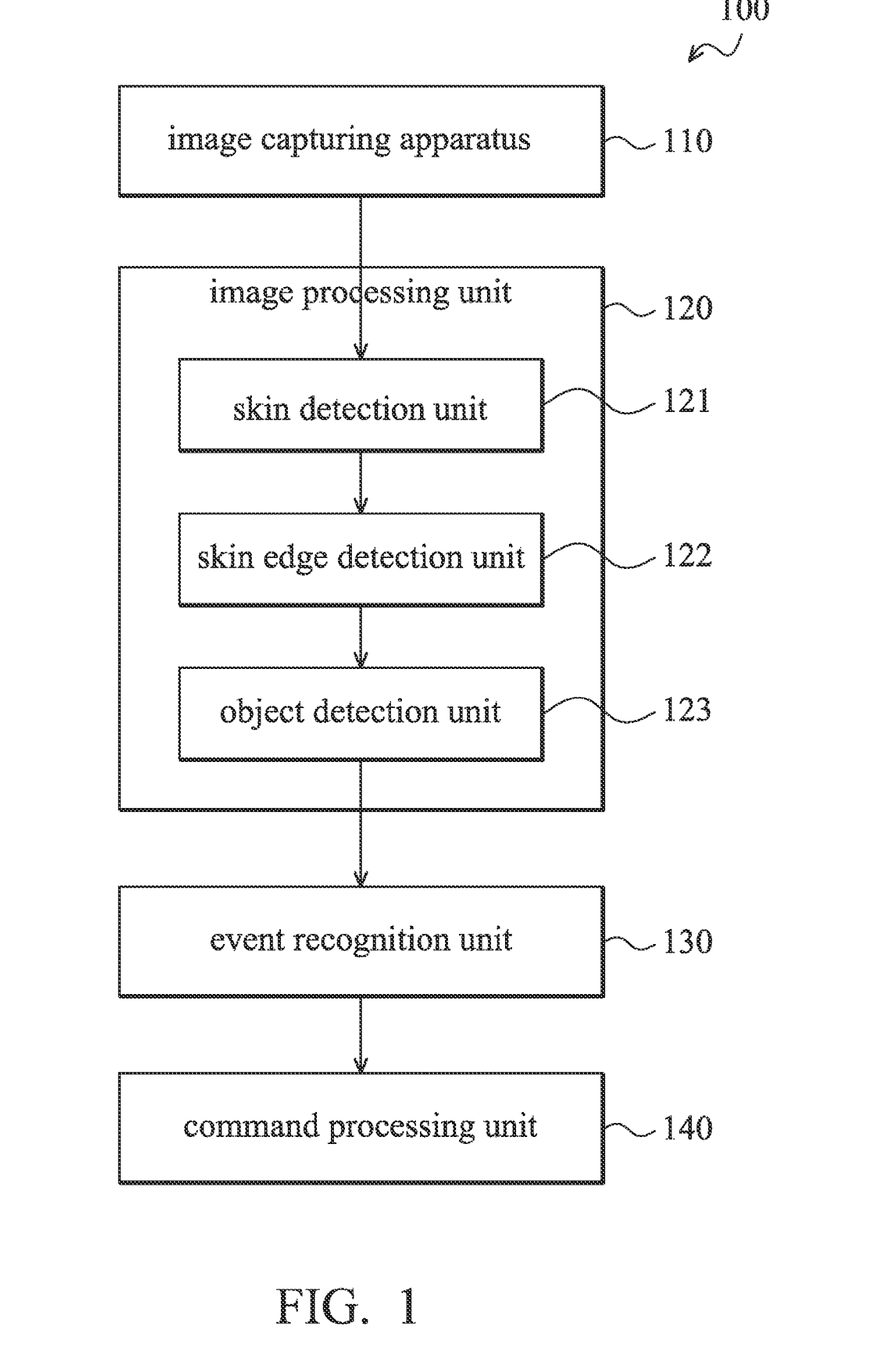
FIG. 1 illustrates a block diagram of the virtual mouse driving apparatus according to an embodiment of the invention.

FIG. 1 illustrates a block diagram of the virtual mouse driving apparatus according to an embodiment of the invention. The virtual mouse driving apparatus 100 may comprise an image capturing apparatus 110, an image processing unit 120, an event recognition unit 130, and a command processing unit 140. The image capturing apparatus 110 is arranged for capturing a plurality of input images continuously. For example, the image capturing apparatus 110 may be a video camera or a smart phone, which is coupled to the image processing unit 120 through a wired or wireless interface such as USB, IEEE 1394, HDMI, Wifi, etc, but the invention is not limited thereto. The image processing unit 120 is arranged for receiving the input images from the image capturing apparatus 110, and performing relevant image processing to recognize a dominant hand (i.e. a single hand) and the finger area (i.e. the corresponding left/right mouse button) thereof of the user. The event recognition unit 130 is arranged for detecting whether any specific events (i.e. moving action or button action) have occurred in the recognized finger area according to the recognized finger area of the dominant hand (i.e. regarded as "the finger zone" hereafter) from the image processing unit 120. The command processing unit 140 is arranged for receiving the detected specific event from the event recognition unit 130, and converting the detected specific event to a virtual mouse control command. It should be noted that the image capturing apparatus 110 may be a common video camera, and other high-hand cameras or stereo-cameras can also be used.

The image processing unit 120 may comprise a skin detection unit 121, a skin edge detection unit 122, and an object detection unit 123. The skin detection unit 121 is arranged for recognizing the skin area of the human body. Because the color of human skin is within a specific color range, the skin detection unit 121 may recognize the skin area within the specific color range in the input images. The skin edge detection unit 122 is arranged for receiving the recognized skin area from the skin detection unit 121, and determining the skin edges of the recognized skin area according to the recognized skin area. In an embodiment, the skin edge detection unit 122 may use prior technologies, such as the "Canny edge detection algorithm", to determine the skin edges of the recognized skin area, and the details will not be described here.

Figure 2:
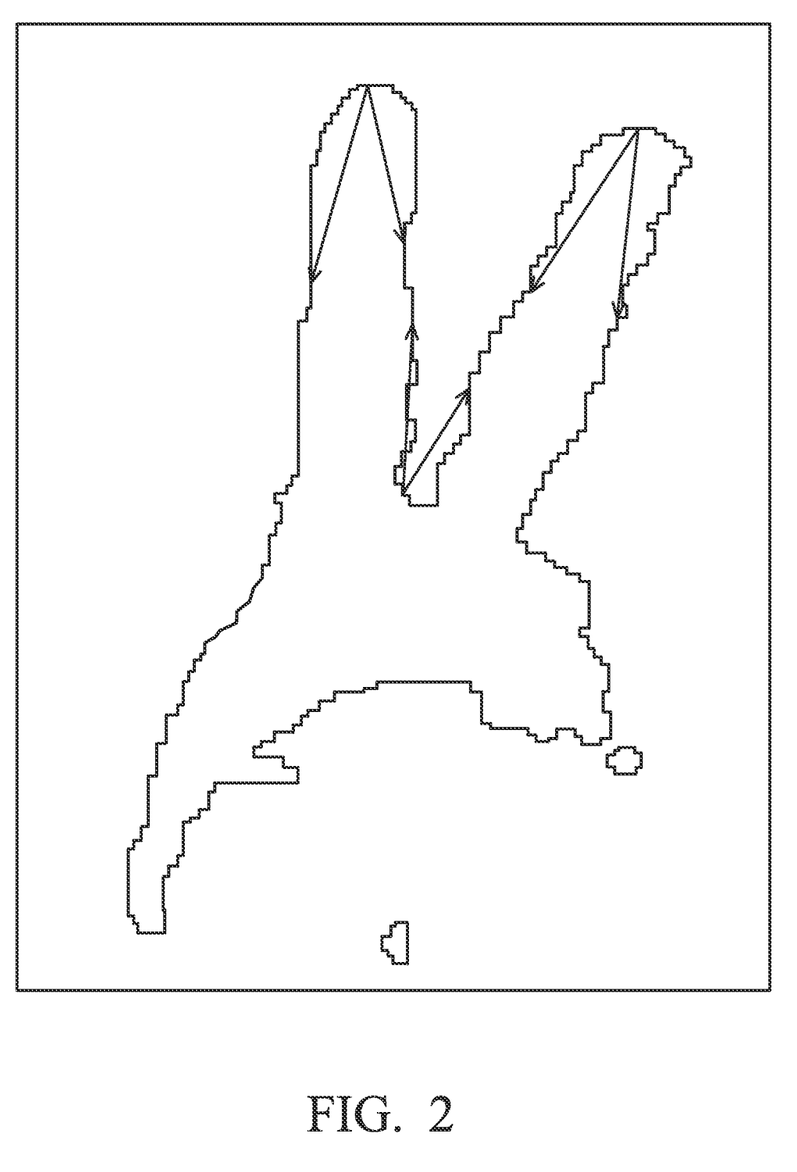
FIG. 2 illustrates a diagram of detecting the included angle between the fingertips according to an embodiment of the invention.

The object detection unit 123 is arranged for receiving the determined skin edges of the recognized skin area generated by the skin edge detection unit 122, and extending a predetermined distance (e.g. 25 pixels) from each pixel as a start point to both sides to obtain two terminal points. The object detection unit 123 may further calculate the included angle between the start point and the two terminal points thereof to obtain the cosine value of the included angle. The object detection unit 123 may further classify the cosine values of each pixel to find the location of the desired feature point. For example, the corresponding included angle of the pixel on the fingertips should be smaller than that of the neighboring pixels. That is, the corresponding cosine value of the pixel on the fingertip should be a local maximum, as illustrated in FIG. 2. By performing the aforementioned steps, the object detection unit 123 may analyze the fingertip point of the recognized skin area, and the valley point between two neighboring fingertip points. It should be noted that the analyzed two fingertip points can be at any two neighboring fingers (e.g. the forefinger and the middle finger, or the middle finger and the ring finger), and the corresponding virtual mouse buttons (e.g. left/right mouse button) can be predetermined by the user. Accordingly, the object detection unit 123 may determine whether any finger area for the virtual mouse can be obtained in the input images. If so, the event recognition unit 130 may further determine the movements of the finger area. If no, the image processing unit 120 may keep detecting the input images.

Figure 3A:
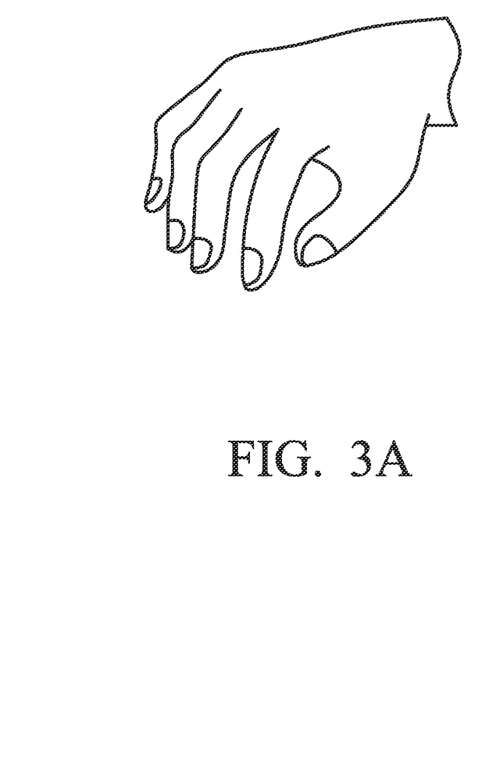
FIG. 3A~3C illustrate diagrams for determining specific events of the virtual mouse according to an embodiment of the invention.
Figure 3B:
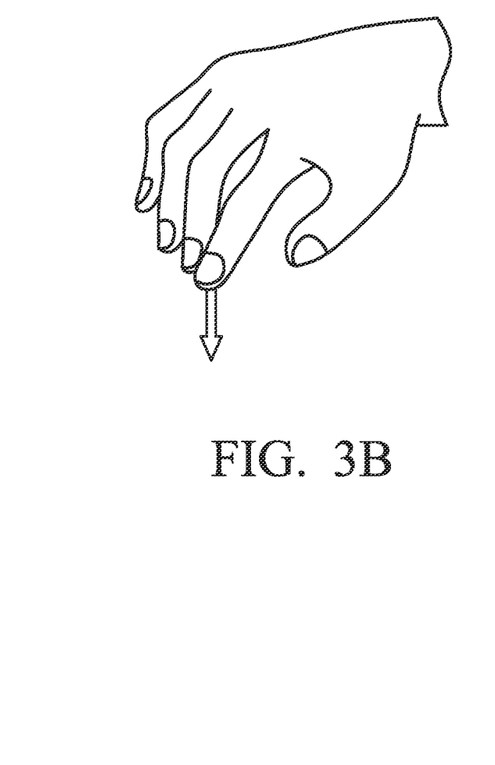
Figure 3C:
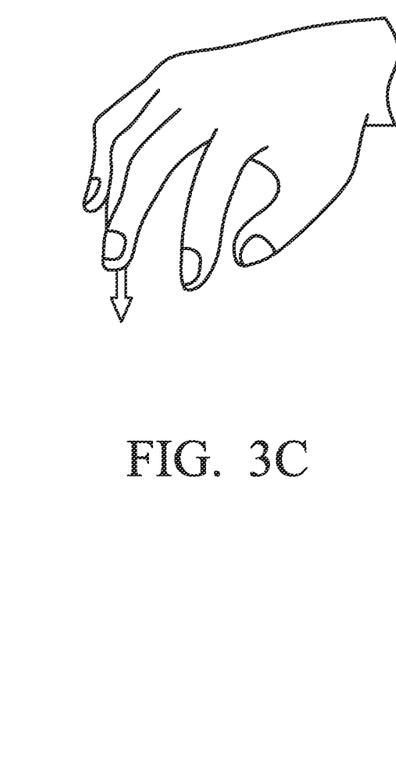

FIG. 3A~3C illustrate diagrams for determining specific events of the virtual mouse according to an embodiment of the invention. As illustrated in FIG. 3A, when the event recognition unit 130 receives the finger area generated by the image processing unit 120, the event recognition unit 130 may determine a reference position according to the finger area. When a finger representing the left button or the right button in the finger area has a "pressing" action, the event recognition unit 130 may determine that either the left button or the right button has been pressed by the finger, as illustrated in FIGS. 3B and 3C. The event recognition unit 130 may also detect whether any "scrolling" action (e.g. scrolling up or scrolling down) has occurred in the finger area. The event recognition unit 130 may further calculate the difference of each two neighboring images in the input images, and determine whether the number of the generated edge points is larger than a predetermined threshold. If so, the event recognition unit 130 may be informed that the user is moving the virtual mouse. If not, the event recognition unit 130 may be informed that the virtual mouse is still. For the detected events of buttons and movements of the virtual mouse, the event recognition unit 130 may send a corresponding control signal to a processing unit (e.g. a CPU, not shown in FIG. 1) to control the cursor on the display screen for operation. It should be noted that the virtual mouse can be operated by detection of the single hand finger area in the application. In addition, the events for controlling the virtual mouse can be a single-click of the left button or the right button, a double-click of the left button or the right button, scrolling-up/scrolling-down movements, and/or click-and-drag movements, etc, but the invention is not limited thereto.

Figure 4:
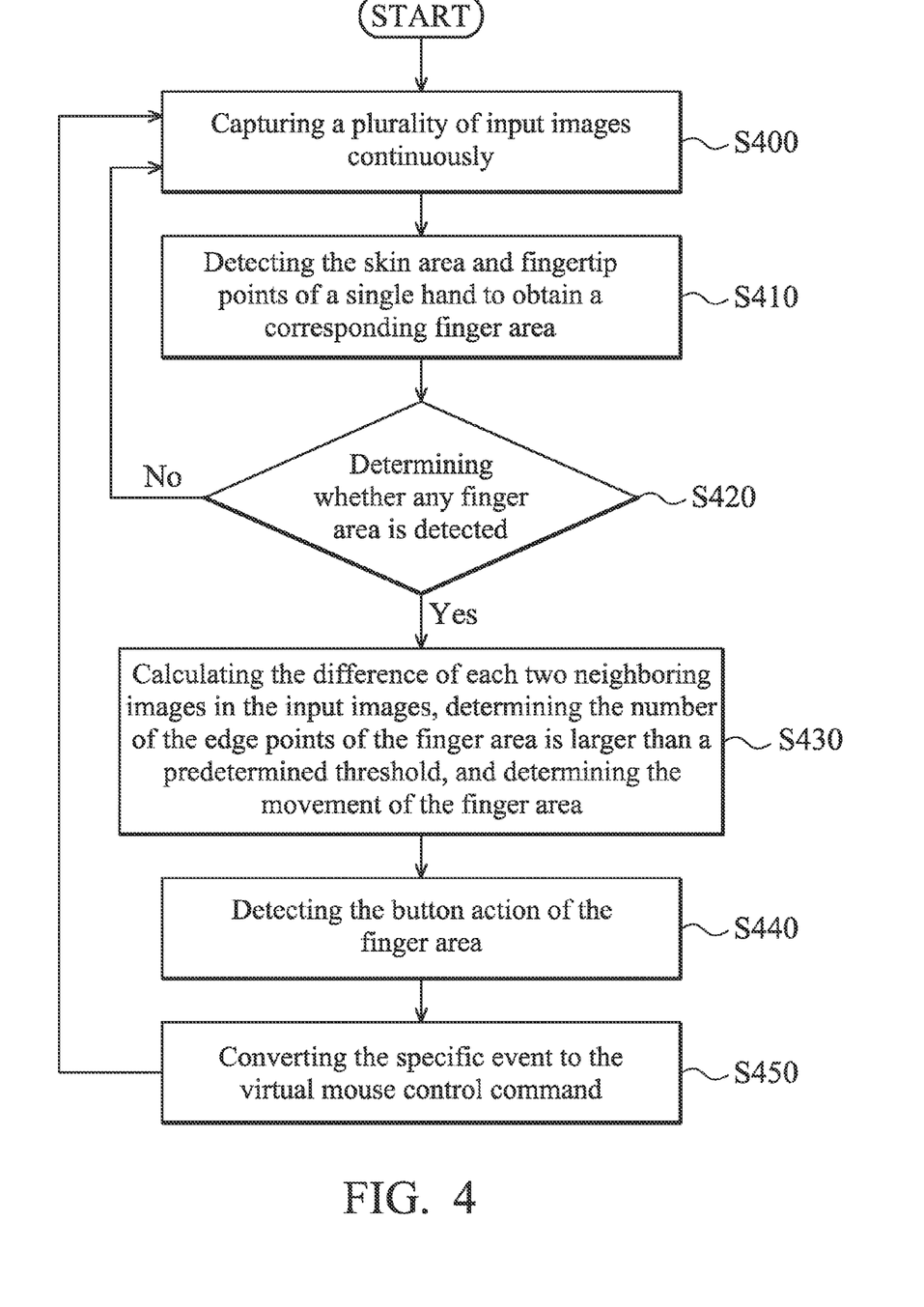
FIG. 4 illustrates a flow chart of the virtual mouse simulation method according to an embodiment of the invention.

FIG. 4 illustrates a flow chart of the virtual mouse simulation method according to an embodiment of the invention. In step S400, the image capturing apparatus 110 may capture a plurality of input images continuously. In step S410, the image processing unit 120 may detect the skin area and the fingertip points of a single hand in the input images to obtain the corresponding finger area. In step S420, the image processing unit 120 may determine whether a finger area has been obtained. If so, step S430 will be executed to recognize specific events of the virtual mouse. If not, step S400 will be executed to capture input images continuously. In step S430, the event recognition unit 130 may calculate the differences of each two neighboring images in the input images, and determine whether the number of the edge points of the finger area exceeds a predetermined threshold. If so, the event recognition unit 130 may determine that the finger area is moving. If not, the event recognition unit 130 may determine that the finger area is still. In other words, it doesn't matter whether or not the finger area is still, the event recognition unit 130 may detect the movement of the finger area. In step S440, the event recognition unit 130 may detect the button action (e.g. clicking the left/right button, or scrolling-up/scrolling-down) of the finger area. In step S450, the command processing unit 140 may convert the detected specific events (e.g. button action and/or movement) to the virtual mouse control command to control the cursor of the virtual mouse on the display screen for operation. Then, step S400 is executed after step S450 to capture input images continuously. It should be noted that in the step S440 in FIG. 4, the event recognition unit 130 may detect the button actions of the finger area according to the differences of each two neighboring images in the input images.

Figure 5A:
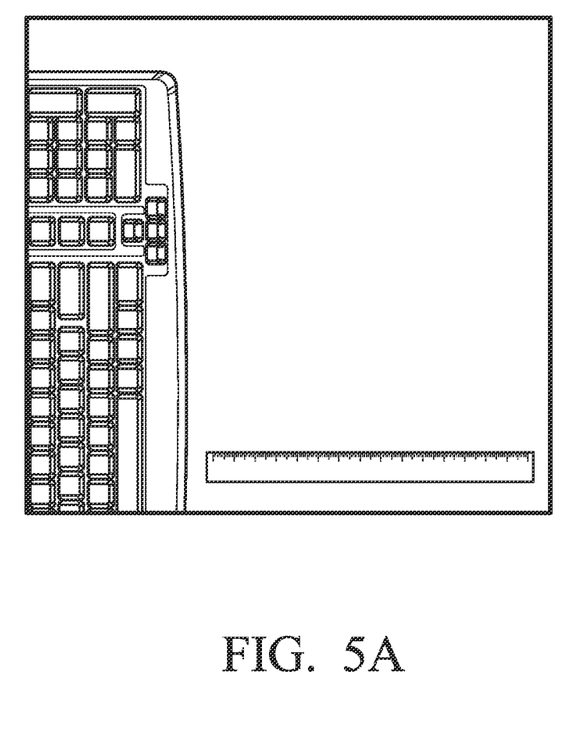
FIG. 5A~5D illustrate diagrams for determining specific events of the virtual mouse according to another embodiment of the invention.

In another embodiment, the object detection unit 123 in the image processing unit 120 may generate a corresponding background image as illustrated in FIG. 5A, and compare the pixels of the input images and the background image to obtain a rough outline of the target object. The background image is used as a reference image in the application. When some backgrounds (e.g. background objects) are removed from the reference image, the object detection unit 123 may correctly recognize the target object. The object detection unit 123 may further perform a noise reduction process to the rough outline of the target object, and obtain a more exact outline of the target object by determining the connected component from the rough outline. For example, the object detection unit 123 may use a low-pass filter, such as a mean filter, a median filter or a Gaussian filter, to filter the noises of the outline of the target object, where the noises may be Gaussian noises or "pepper and salt" noises. The object detection unit 123 may determine the connected component by using the principle of "stack" in the data structure. The object detection unit 123 may put the pixels, which are adjacent to the current pixel and belong to the coordinate of the same color, to the stack and record the largest and smallest area simultaneously. The object detection unit 123 may further label the pixels in the stack to pixels belonging to different colors to prevent duplicating the aforementioned processes, wherein all the pixels belonging to the same color would be processed cyclically and repeatedly.

Figure 5B:
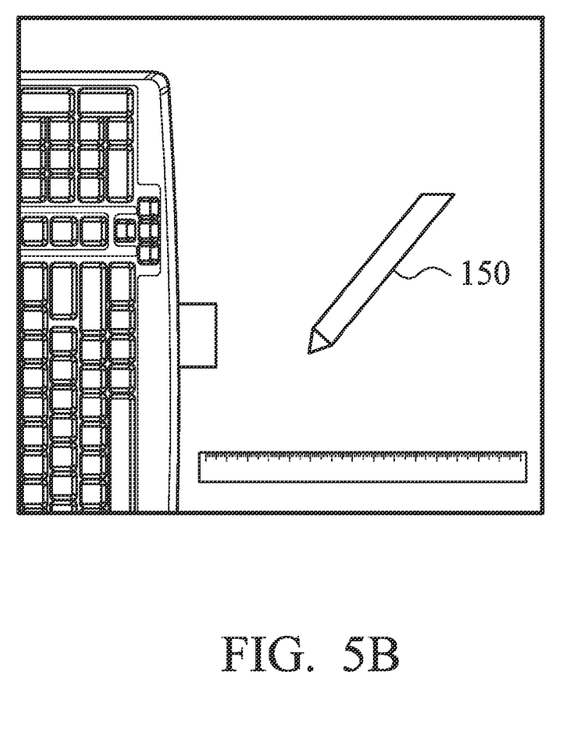
Figure 5C:
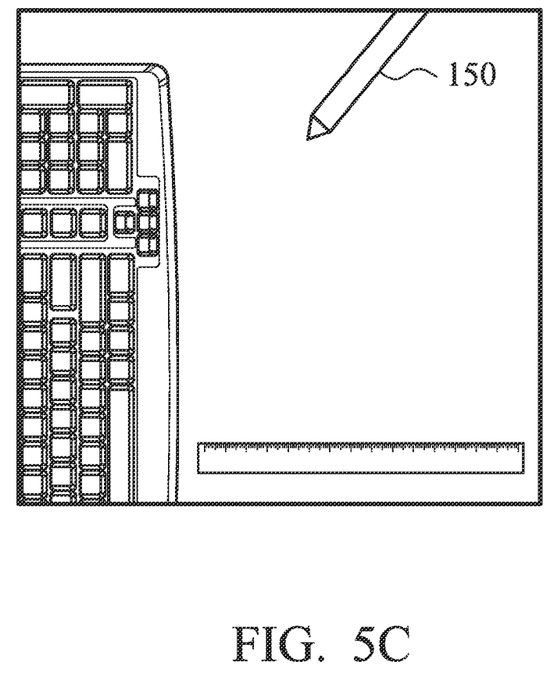
Figure 5D:
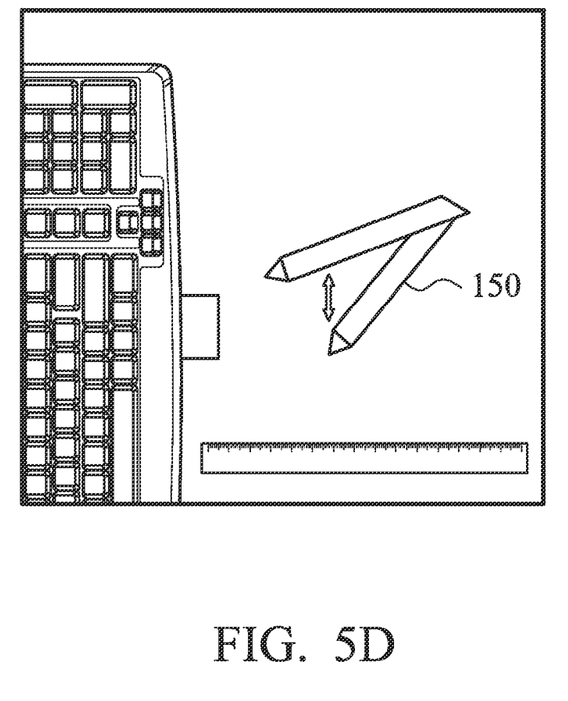

The event recognition unit 130 may obtain the two-dimensional coordinate of the target object 150 according to the target object 150 determined by the object detection unit 123, and label the target object 150. That is, a corner of the target object 150 is used as a reference position, as illustrated in FIG. 5B. The event recognition unit 130 may further determine the moving condition of the target object 150 to learn which action the user is performing (e.g. moving up/down/left/right, single-click, and/or double-click), and generate a corresponding specific event signal. Then, the command processing unit 140 may convert the specific event signal detected by the event recognition unit 130 to the virtual mouse control command. For example, as illustrated in FIG. 5C, the event recognition unit 130 may determine that the target object 150 is moving toward the right direction. As illustrated in FIG. 5D, the event recognition unit 130 may determine that the target object is "knocking" (i.e. moving up and down) twice indicating that the left mouse button is being clicked. For those skilled in the art, it should be realized that the shape of the target object 150 is not limited to a bar shape, and the virtual mouse driving apparatus in the application may use an object with any shape as the target object to control the virtual mouse.

Figure 6:
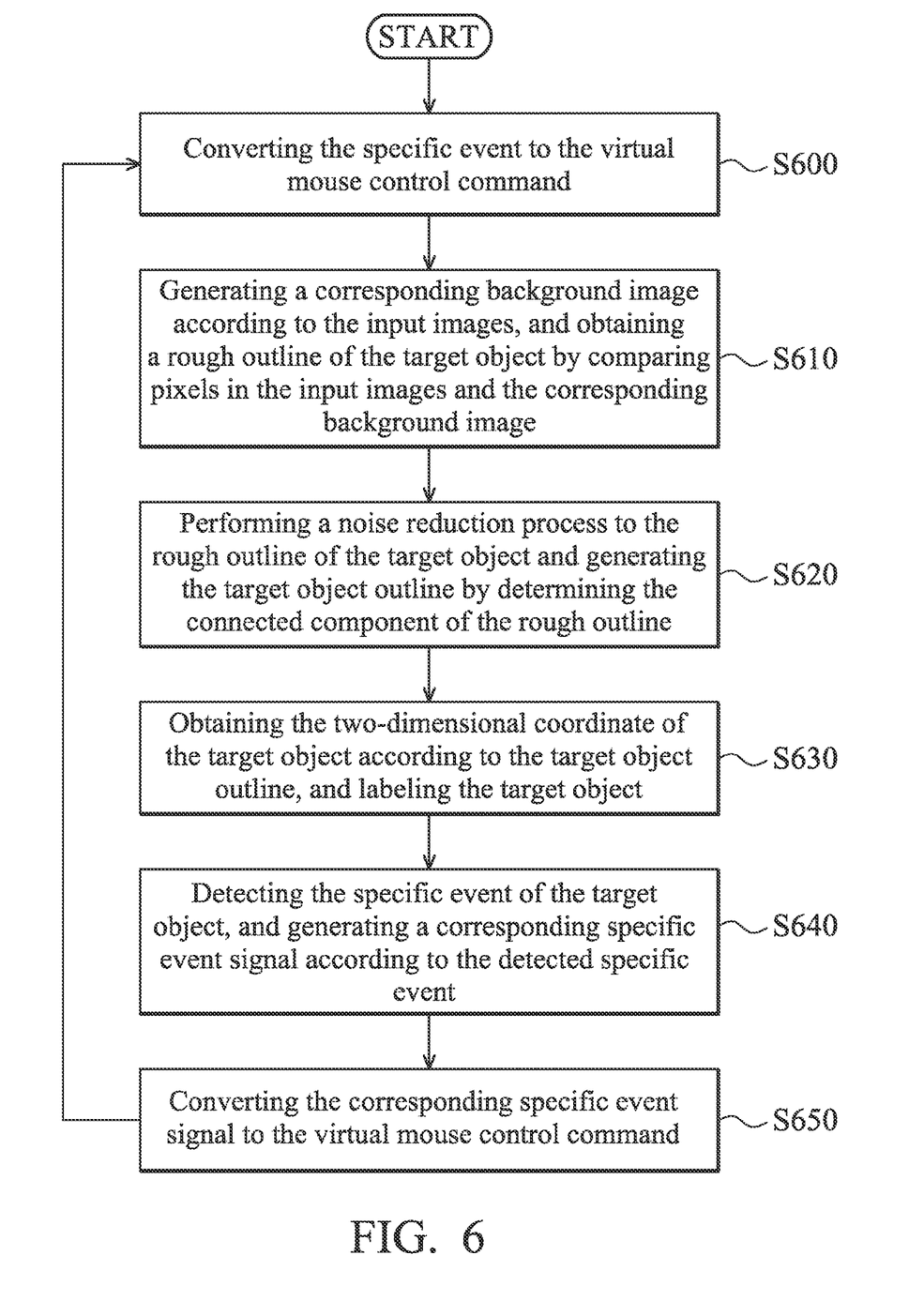
FIG. 6 illustrates a flow chart of the virtual mouse simulation method according to another embodiment of the invention.

FIG. 6 illustrates a flow chart of the virtual mouse simulation method according to another embodiment of the invention. In step S600, the image capturing apparatus 110 may capture a plurality of input images continuously. In step S610, the object detection unit 123 may generate a corresponding background image according to the input images, and compare the input images with the background image to obtain a target object and a rough outline thereof. In step S620, the object detection unit 123 may perform a noise reduction process to the rough outline of the target object, and obtain the outline of the target object by determining the connected component of the rough outline. In step S630, the event recognition unit 130 may obtain the two-dimensional coordinate of the target object according to the outline of the target object, and label the target object. In step S640, the event recognition unit 130 may detect specific events of the target object (e.g. moving up/down/left/right, single-click, and/or double-click), and generate a corresponding specific event signal according to the detected specific events. In step S650, the command processing unit 140 may convert the specific event signal to the corresponding virtual mouse control command in order to control the virtual mouse on the display screen.

The methods, or certain aspects or portions thereof, may take the form of program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine, such as a computer, the machine thereby becomes an apparatus for practicing the methods. The methods may also be embodied in the form of program code transmitted over some transmission medium, such as an electrical wire or a cable, or through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A virtual mouse driving apparatus, comprising
an image capturing apparatus arranged for capturing a plurality of input images continuously;
an image processing unit arranged for detecting a finger area from the plurality of input images;
an event recognition unit arranged for detecting a specific event of the finger area; and
a command processing unit arranged for generating a corresponding virtual mouse control command according to the specific event,
wherein the image processing unit detects a skin area from the plurality of input images, and generates a skin edge area according to the skin area, and the image processing unit further calculates an included angle between each pixel of the skin edge area and two terminal points extended by a predetermined distance from both sides thereof, calculates a corresponding cosine value of the included angle, and generates the finger area according to the corresponding cosine value.

2. The virtual mouse driving apparatus as claimed in claim 1, wherein the event recognition unit calculates a difference of each two neighboring images in the plurality of input images, and obtains a plurality of edge points from the neighboring images according the difference and the finger area, and the event recognition unit further determines whether a number of the edge points is larger than a predetermined threshold, wherein if so, the event recognition unit determines that the finger area is at a moving action, and if not, the event recognition unit determines that the finger area is still.

3. The virtual mouse driving apparatus as claimed in claim 2, wherein the event recognition unit further determines whether a button action is incurring by a left button finger or a right button finger in the finger area, wherein the specific event comprises the moving action and/or the button action, and the event recognition unit further generates a specific event signal according to the moving action and the button action.

4. The virtual mouse driving apparatus as claimed in claim 3, wherein the command processing unit further converts a specific event signal to the virtual mouse control command.

5. A virtual mouse simulation method, used in a virtual mouse driving apparatus, comprising:
capturing a plurality of input images continuously;
detecting a finger area from the plurality of input images;
detecting a specific event of the finger area;
generating a corresponding virtual mouse control command according to the specific event; and
recognizing the finger area, further comprising:
detecting a skin area from the plurality of input images;
generating a skin edge area according to the skin area;
calculating an included angle between each pixel of the skin edge area and two terminal points extended by a predetermined distance from both sides thereof, and calculating a corresponding cosine value of the included angle; and generating the finger area according to the corresponding cosine value of the included angle.

6. The virtual mouse simulation method as claimed in claim 5, wherein the step of detecting the specific event of the finger area further comprises:
- calculating a difference of each two neighboring images in the plurality of input images;
- obtaining a plurality of edge points from the neighboring images according to the difference and the finger area;
- determining whether a number of the edge points is larger than a predetermined threshold, wherein:
- if a number of the edge points is larger than a predetermined threshold, determining that the finger area is at a moving action; and
- if a number of the edge points is not larger than a predetermined threshold, determining that the finger area is still.

7. The virtual mouse simulation method as claimed in claim 6, wherein the step of detecting the specific event of the finger area further comprises:
- determining whether a button action is incurring by a left button finger or a right button finger of the finger area, wherein the specific event comprises the moving action and/or the button action; and
- generating a corresponding specific event signal according to the button action and the moving action.

8. The virtual mouse simulation method as claimed in claim 7, further comprising:
- converting the specific event signal to the virtual mouse control command.

* * * * *